Figure 1:
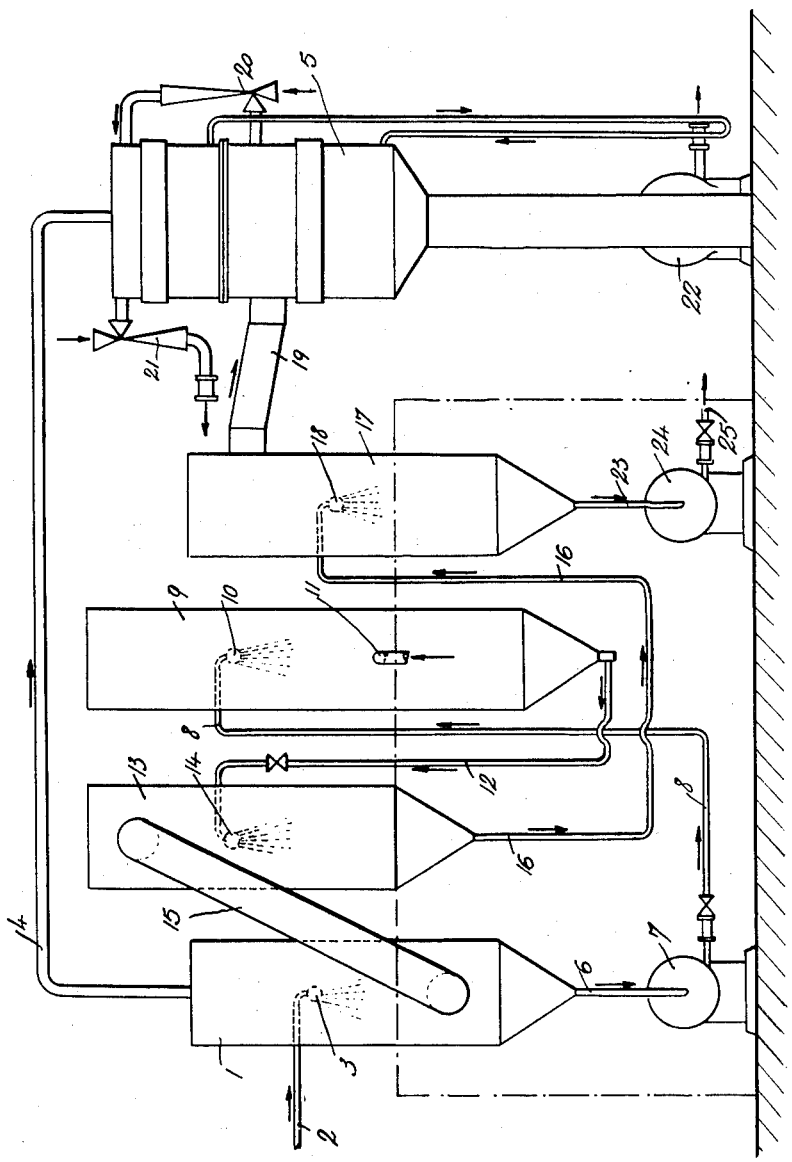

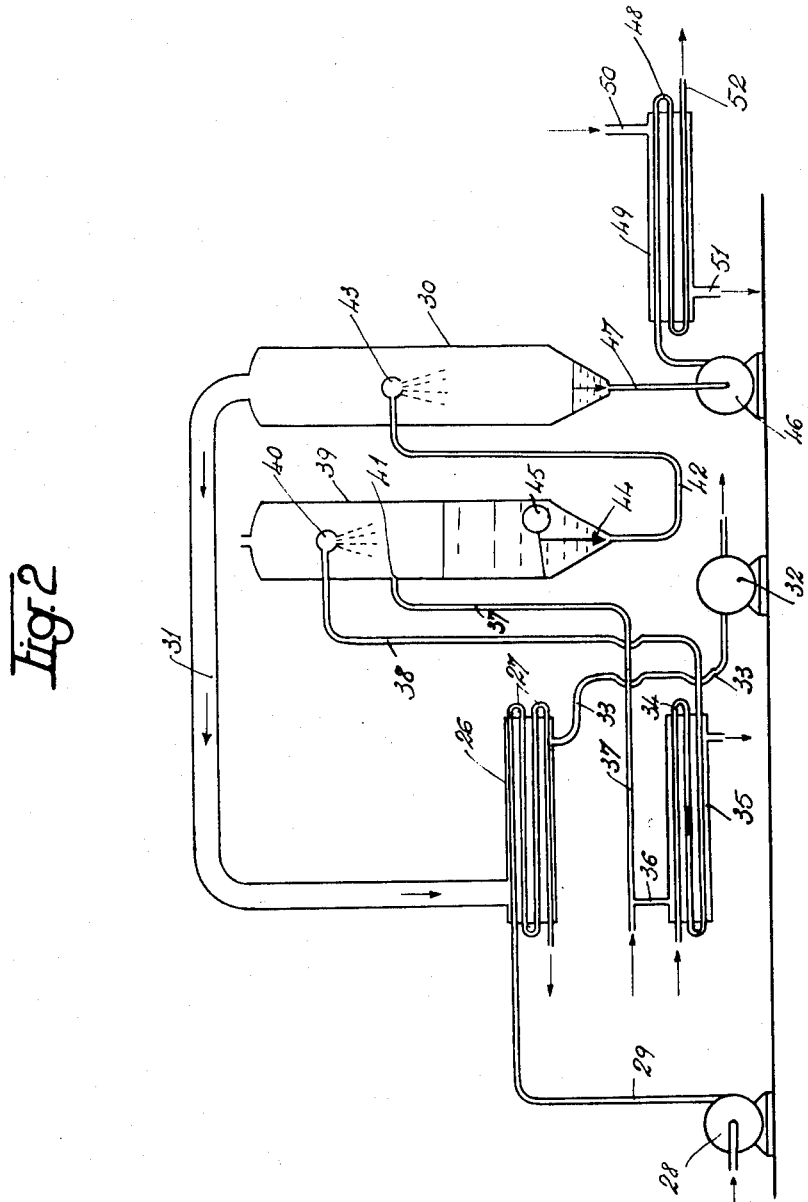

United States Patent Office 2,732,308
Patented Jan. 24, 1956

2,732,308

METHOD AND DEVICE FOR PASTEURIZING OR STERILIZING LIQUID OR SEMI-LIQUID PRODUCTS

Pierre Robert Laguilharre, Enghien-les-Bains, France

Application March 20, 1952, Serial No. 277,676

Claims priority, application France March 3, 1952

3 Claims. (Cl. 99—212)

This invention relates in general to the pasteurisation or sterilization of foods or other products and more particularly to an improved method of continuously pasteurising or sterilizing foods or other products in liquid or semi-liquid condition, for example dairy-produce such as milk or cream, fruit-juice, various tinned foods, etc. The present invention is also concerned with a device for carrying out this improved method.

It is known to pasteurise or sterilize products of the above defined kind by injecting steam into the preferably finely divided product in order to raise its temperature to the desired value, and subsequently cooling by expansion the thus heated product by reducing the pressure thereof to a value corresponding to the desired final temperature, this expansion taking place in one or a plurality of steps.

This invention is concerned more particularly with an improvement brought to this known method of pasteurising or sterilizing food and similar substances whereby the heated product to which pasteurising or sterilizing steam has been injected is allowed to expand at least once to an intermediate pressure between the pressure corresponding to the initial temperature of the product to be pasteurised or sterilized and the pressure corresponding to the pasteurising or sterilizing temperature, the steam released during this expansion being used for pre-heating the product to be pasteurised or sterilized before the latter is subjected to the pasteurising or sterilizing step proper.

It will be easily understood that the improved method broadly defined hereinabove makes it possible to effect substantial savings in live steam during the pasteurisation or sterilization process since the products to be pasteurised or sterilized are already brought to a temperature intermediate between its initial temperature and that required for the pasteurisation or sterilization by the pre-heating step introduced in the process. Thus, for instance, if the pre-heating temperature is the arithmetical average between the initial temperature and the temperature required for completing the pasteurization or sterilization proper, the latter may be carried out with only one-half of the live steam used with the conventional method. Besides, with the present invention the amount of water required for the final condensation of the steam used in the continuous treatment is reduced accordingly.

The pasteurised or sterilized product subjected to the expansion step to the above-defined intermediate pressure is thus cooled by this expansion to a temperature corresponding to the pressure at which this expansion took place. In carrying out the method of this invention, the thus cooled product may be either led directly at this temperature to its place of subsequent use or subjected to a further cooling operation, for instance through another expansion in one or several steps, or by means of a conventional cooling device.

The device provided by this invention for carrying out the improved method set forth above comprises, as a rule a first closed chamber constituting a pre-heating chamber for the product to be treated and means keeping the atmosphere in this chamber to a pressure intermediate between the pressure corresponding to the initial temperature of the product to be pasteurised or sterilized and the pressure corresponding to the pasteurising or steriliizng temperature, a second closed chamber constituting the pasteurisation or sterilization chamber, means for circulating the product to be pasteurised or sterilized from the aforesaid first chamber to the second chamber and injecting it into said second chamber and means for feeding this second chamber with live steam at the pasteurising or sterilizing temperature, a third closed chamber serving as an intermediate expansion chamber, means for circulating the pasteurised or sterilized product from the lower portion of the second chamber to the third chamber and injecting it into this third chamber, and means for connecting the atmosphere in this third chamber with the atmosphere in the first chamber and directing the steam released from the third chamber to the first chamber of the device.

If the method according to the invention is applied to a pasteurisation (for instance to the pasteurisation of milk) the latter is carried out at a temperature lower than 100° C. and steam is introduced into the second or pasteurising chamber at a pressure lower than or equal to atmospheric pressure. On the contrary, if the method is applied to a sterilization, as the latter is carried out at a temperature higher than 100° C. steam is introduced into the sterilizing chamber at a pressure above atmospheric pressure.

In all cases when the pasteurised or sterilized product is to be cooled to a final temperature lower than that at which it is delivered from the intermediate expansion chamber, complemental cooling means are added to the plant. These means may comprise at least one conventional heat-exchanger; said means may also be constituted by one or several additional expansion chambers in which the liquid or semi-liquid product is successively injected, and means adapted to keep the atmospheres in these chambers at pressures corresponding to the desired cooling temperatures to be applied to the product, respectively. According to a first embodiment of the invention, the equipment comprises a single additional expansion chamber and a vacuum condenser with a two-stage ejector system for producing the required vacuum values on the one hand in the pre-heating chamber (and consequently in the intermediate expansion chamber) and, on the other hand, in the additional expansion chamber.

According to a simple embodiment of this invention, the apparatus comprises a heat exchanger in which is circulated the product extracted from the expansion chamber.

The accompanying drawing forming part of this specification illustrates diagrammatically by way of example two possible embodiments of a pasteurising equipment according to this invention.

In the embodiment of Fig. 1, 1 denotes the pre-heating chamber fed with the product to be pasteurised through a delivery pipe 2 provided at its inner end with an atomizing nozzle 3 of any suitable description. The top portion of this chamber 1 is connected through a pipe 4 with a vacuum-creating apparatus 5 the detailed description of which will be given presently. The bottom portion of the pre-heating chamber 1 is connected through a pipe 6 with the intake side of a pump 7 the delivery side of which is fed through a pipe 8 to a chamber 9 constituting the pasteurising chamber proper. The end portion of pipe 8 projects inside this chamber and is fitted with an atomizing nozzle 10 of any convenient type; 11 is the device for delivering live steam for pasteurising the product inside this chamber 9.

According to the present invention, the lower portion of the pasteurising chamber 9 is connected through a pipe 12 with an intermediate expansion chamber 13. This pipe 12 extends with its end portion inside this expansion chamber 13 and carries at this end an atomizing nozzle 14. Moreover, the atmosphere in this chamber 13 is connected through a pipe 15 with that in the aforesaid preheating chamber 1 as shown. However, this pipe 15 has a considerably greater cross-sectional area than the other pipes of the system.

The lower portion of chamber 13 communicates through a pipe 16 with an expansion chamber 17 provided for the purpose of ensuring a complemental cooling of the pasteurised product, the pipe 16 terminating inside this chamber 17 with an atomizing nozzle 18. As illustrated in the drawing, this chamber 17 is connected by means of another large-sized duct 19 with a vacuum condenser 5. The latter is of the two-stage ejector type in the embodiment illustrated. It comprises a lower compartment fed through the aforesaid duct 19 from the expansion chamber 17 and an upper compartment receiving the delivery end of the pipe 4 from the top portion of the pre-heating chamber 1. The assembly is so adjusted that the vacuum created in the chamber 1 has a value corresponding for instance to a pre-heating temperature of about 45° C. and that the vacuum produced in the chamber 17 is equivalent for instance to a final temperature of about 30° C. The steam led through the pipe 19 to the lower compartment of a condenser 5 is condensed in this compartment for instance by spraying water therein, the non-condensible fluid particles released from this lower compartment passing through an ejector 20 and being fed thereby to the upper compartment. The steam released from this upper compartment is condensed in turn by jets of cooling water introduced into the steam space, and the non-condensible products are vented to the atmosphere through an ejector 21. The condensate water collected to the bottom of condenser 5 is drained therefrom by a pump 22.

Finally, the bottom of the expansion chamber 17 is connected through a pipe 23 with the intake of a discharge pump 24 the delivery side of which is connected through a pipe 25 to the place where the pasteurised and cooled product is to be either submitted to subsequent treatments or utilized as such.

The cyclical operation of the above-described apparatus is as follows:

The product to be pasteurised (for instance milk) is fed continuously to the pre-heating chamber 1 at a temperature of, say, 15° C. and finely divided therein by the atomizing nozzle 3. The liquid collected to the bottom portion of chamber 1 is drained therefrom by the pump 7 and delivered into the pasteurising chamber 9 wherein it is again finely atomized by the nozzle 10. The live steam introduced by the distributor 11 into this chamber 9 has a temperature adapted to raise the temperature of the product for instance to about 80° C. Due to this increment in temperature, the pasteurised product gathers in the lower portion of chamber 9 and is circulated through the pipe 12 to the inside of the intermediate expansion chamber 13. The expansion effected in this chamber is such as to reduce the temperature of the product to about 50° C. The steam released during this expansion step is transferred to the pre-heating chamber 1 due to the vacuum existing therein so that the product to be pasteurised fed to this chamber is pre-heated to about 45° C. It is obvious that since the product to be pasteurised has been subjected to this pre-heating step and enters the pasteurising chamber proper at about this temperature, the amount of live steam to be introduced into the pasteurising chamber 9 for the pasteurising step is merely restricted to that required for raising the temperature of the product from 45° C. to 80° C.

As already set forth hereinabove, the pasteurised product from chamber 9 is subsequently cooled to about 50° C. in the intermediate expansion chamber 13 and then fed through the pipe 16 into the complemental cooling chamber 17 and again expanded therein so as to reduce its temperature to about 30° C. The discharge pump 24 drains the product from the lower portion of chamber 17 and delivers it either to the place where it is utilized or to other apparatus for subsequent treatments.

In the embodiment of Fig. 2, 26 is the pre-heating chamber which is provided with a nest of tubes 27 in which the product to be treated is circulated by means of a pump 28 and a pipe 29. The pre-heating chamber 26 is connected, on the one hand, to the expansion chamber 30 through the pipe 31 and, on the other hand, to a vacuum pump 32 through the pipe 33.

The product leaving out the nest of tubes 27 is generally fed to a standardizing apparatus, such as for example a cream separator (not shown) when milk is treated. It is afterwards fed to the pasteurising or sterilizing chamber.

According to a modification of this embodiment, the product is first fed to a second nest of tubes 34 provided in a chamber 35 which receives live steam through a pipe 36 connected to the main pipe 37.

The outlet of the nest of tubes 34 is connected through a pipe 38 to the pasteurising chamber 39. The pipe 38 penetrates inside said chamber and is provided at its inner end with an atomizing nozzle 40 of any convenient structure. Live steam fed by the pipe 37 enters said chamber at 41 for pasteurising the product, which is collected at the bottom of said chamber.

The bottom of the chamber 39 is connected through a pipe 42 to the expansion chamber 30 in which said pipe extends and is provided at its inner end with an atomizing nozzle 43. The opening through which the pipe 42 communicates with the bottom of the chamber 39 can be obturated by a valve 44, controlled in a known manner by a float 45.

A pump 46, connected to the bottom of the expansion chamber 30 through the pipe 47 allows extracting the product which accumulates itself in the bottom of said chamber and to send it to a refrigerating nest of tubes 48. Said nest of tubes is disposed inside a chamber 49 in which a cooling fluid is introduced through the pipe 50 and evacuated through the pipe 51.

The cold and pasteurised or sterilized product is evacuated from the device through the pipe 52.

The operation of this embodiment is the same as that of the embodiment described with reference to Fig. 1.

The preheated product is finely divided by the nozzle 40 and is immediately brought into contact with the steam; it is thus brought to the temperature of pasteurisation or sterilization and accumulates in the bottom of the chamber 39.

The product is then transferred to the chamber 30 and finely divided by the nozzle 43. As this chamber is maintained under partial vacuum through the pipe 31, the chamber 26, the pipe 33 and the pump 32, the product is cooled and produces vapors which heat the chamber 26. As explained above, the product is then extracted through the pump 46 and further cooled in the nest of tubes 48.

Of course, whereas the above may be considered as the description of the preferable embodiment of my invention, I do not limit myself to the precise conditions or proportions set forth or shown in the drawing as they may be varied by those skilled in the art in accordance with the products for which they are intended and the temperature, pressure and vacuum values to be attained in the various parts thereof. Thus, obvious modifications may occur to a person skilled in the art, especially, as already stated, when a sterilizing process is contemplated which comprises a steam treatment of the product at a temperature higher than 100° C. and therefore at a pressure above atmospheric value.

On the other hand, instead of providing a single intermediate expansion of the pasteurised or sterilized product, the latter may be subjected to several expansions in succession at gradually decreasing pressures and the steam developed during these expansions may be utilized for accomplishing successive pre-heating steps in the product to be pasteurised or sterilized, these steps occurring at progressively increasing intermediate temperatures between its initial temperature and the pasteurising or sterilizing temperature.

What I claim is:

1. The method of producing a sterilized liquid food product in a continuous vacuum pasteurization process, which comprises introducing the liquid food stuff to a preheating zone at a temperature of the order of 15° C., advancing the liquid food stuff from the preheating zone to a closed pasteurizing zone in a finely divided state and there directly subjecting same to ordinary steam to heat the product to about 80° C., thereafter introducing the liquid food stuff in liquid state to a closed expansion zone also in finely divided state and cooling the liquid down by expansion to approximately 50° C. and creating vapors, conducting the vapors from said expansion zone to the preheating zone for preliminarily heating the liquid food stuff therein to a temperature of the order of 45° C., applying sub-atmospheric pressure to the preheating and expansion zones, maintaining said zones under sub-atmospheric pressure, and withdrawing the treated product from the expansion zone.

2. Apparatus for sterilizing liquid or semi-liquid products, comprising means providing a closed preheating chamber for first receiving the product to be sterilized, means providing a closed sterilizing chamber, means providing a conduit for conducting the product from the lower portion of the preheating chamber means to said sterilizing chamber means, a pump for causing the product to flow through said conduit means, a nozzle for said conduit means and disposed in said sterilizing chamber for finely dividing the product introduced therein, means for introducing ordinary steam into said sterilizing chamber, means providing a closed expansion chamber, means providing a conduit for conducting the product from the lower portion of the sterilizing chamber to said expansion chamber means, a nozzle for said last conduit means disposed in said expansion chamber means for finely dividing the product discharged therein, vacuum apparatus for maintaining said preheating and expansion chamber means under sub-atmospheric pressure, means providing a conduit for conducting vapors from said expansion chamber means to said preheating chamber means thereby to preheat the product introduced to the latter, and means for withdrawing the treated product from the lower portion of an expansion chamber.

3. Apparatus as claimed in claim 2, in which the nest of tubes through which the product to be treated is circulated is disposed within the preheating chamber means.

References Cited in the file of this patent

UNITED STATES PATENTS

| | | |
|---|---|---|
| 2,410,077 | Johnston | May 28, 1946 |
| 2,516,099 | Board et al. | July 25, 1950 |